United States Patent [19]

Hayes

[11] Patent Number: 4,676,481
[45] Date of Patent: Jun. 30, 1987

[54] SEAL FOR HIGH PERFORMANCE BUTTERFLY VALVE

[75] Inventor: William R. Hayes, Cincinnati, Ohio

[73] Assignee: White Consolidated Industries, Inc., Cleveland, Ohio

[21] Appl. No.: 922,154

[22] Filed: Oct. 23, 1986

Related U.S. Application Data

[63] Continuation of Ser. No. 747,979, Jun. 24, 1985, abandoned.

[51] Int. Cl.$^4$ ............................................. F16K 25/00
[52] U.S. Cl. ..................................... 251/173; 251/306
[58] Field of Search ............... 251/305, 306, 173, 175, 251/192, 172, 359; 277/27

[56] References Cited

U.S. PATENT DOCUMENTS

| | | | |
|---|---|---|---|
| 4,114,856 | 9/1978 | MacAfee et al. | 251/173 |
| 4,281,817 | 8/1981 | Adams et al. | 251/305 |
| 4,410,163 | 10/1983 | Scobie et al. | 251/306 |
| 4,457,490 | 7/1984 | Scobie | 251/306 |
| 4,513,946 | 4/1985 | Priese | 251/306 |

*Primary Examiner*—Martin P. Schwadron
*Assistant Examiner*—Sheri M. Novack
*Attorney, Agent, or Firm*—Schweitzer & Cornman

[57] ABSTRACT

The disclosure is directed to a high performance, leak tight seal for use primarily in butterfly control valves. In accordance with a significant feature of the invention, the seal is arranged and configured whereby fluid pressure within the butterfly valve environment is retained by the seal through three clearly defined, discrete pressure range operating stages. The seal is mounted within a seal containment chamber formed in the valve housing. The fluid pressure inherently and automatically orients the seal relative to the seal containment chamber to provide a seal geometry, containment chamber support, stress distribution and seal deflection which is optimum for the pressure range of the particular operating mode. The basic operating principle embodied in the seal of the invention provides for a reorientation of the seal relative to the seal confinement chamber due to pressure effects upon the seal, whereby the seal retention point is moved inwardly toward the sealing surface in the successive higher pressure operating modes. In this manner, the pressure effects upon the seal are maintained at a practicable minimum to considerably reduce wear and tear on the seal and thereby greatly extend the worklife thereof.

5 Claims, 6 Drawing Figures

SEAL FOR HIGH PERFORMANCE BUTTERFLY VALVE

This is a continuation of application Ser. No. 747,979, filed June 24, 1985, now abandoned.

BACKGROUND AND SUMMARY OF THE INVENTION

The present invention is directed to a butterfly valve and, more particularly, to a new and improved high performance, leak tight seal for a butterfly control valve.

Typically, a butterfly valve comprises a vane in the form of a disc with a part sherical periphery. The disc is rotatably mounted within the fluid path of a valve housing, whereby the vane periphery may be rotated to engage the internal surfaces of the housing to shut the valve. When in the closed position, it is desirable to provide a seal element between the vane periphery and valve housing surface to insure a leak tight valve shut off. Accordingly, the prior art contains numerous proposals for a seal element construction suitable for sealing the vane of a butterfly valve. Typically, the seal element is in the form of a ring seal that extends circumferentially about the valve housing at the position where the vane periphery is rotated at the valve shut off. The seal engages the vane periphery and applies a radial squeeze thereon to seal the valve. The prior art includes seals having glass filled membranes to provide dimensional stability to the seal element during operation of the valve. In addition, many previous proposals for a butterfly valve seal utilize additional spring elements arranged to impart a radial squeeze by the seal on the vane periphery.

It is a primary objective of the present invention to provide a new and improved seal element for use in a high performance butterfly control valve. Generally, the seal element comprises an annular seal element formed to a predetermined cross section including three integral portions. The middle portion is arranged to extend relative to the upper first portion and lower third portion in the upstream fluid flow direction, and the first portion only is securely mounted within a seal containment chamber which generally surrounds and conforms to the predetermined cross section of the seal element. The third portion is arranged to extend from the seal containment chamber and into the fluid flow path of the valve housing whereby the third portion may engage the periphery of the vane at valve shut off to provide a leak tight seal.

Pursuant to a significant feature of the invention, fluid pressure will be retained by the seal element through three clearly defined discrete pressure range operating stages of the seal element. During each of the discrete pressure range operating modes of the seal element, the fluid pressure will inherently and automatically orient the seal relative to the seal containment chamber to provide a seal geometry, containment chamber support, stress distribution and seal deflection which is optimum for the pressure range of the particular operating mode. In this manner, the pressure effects upon the seal element are maintained at a practical minimum for each of the three discrete pressure ranges to considerably reduce wear and tear on the seal element and thereby greatly extend the worklife of the seal of the invention. Significantly, the present invention teaches a seal element that achieves leak tight valve shut off over a long worklife without the need of glass filled internal membranes for dimensional stability or additional spring elements to impart a radial squeeze.

For a better understanding of the above, and other features and advantages of the invention, reference should be made to the following detailed description of a preferred embodiment of the invention and to the accompanying drawings.

DETAILED DESCRIPTION OF A PREFERRED EMBODIMENT

Figures 1, 2:
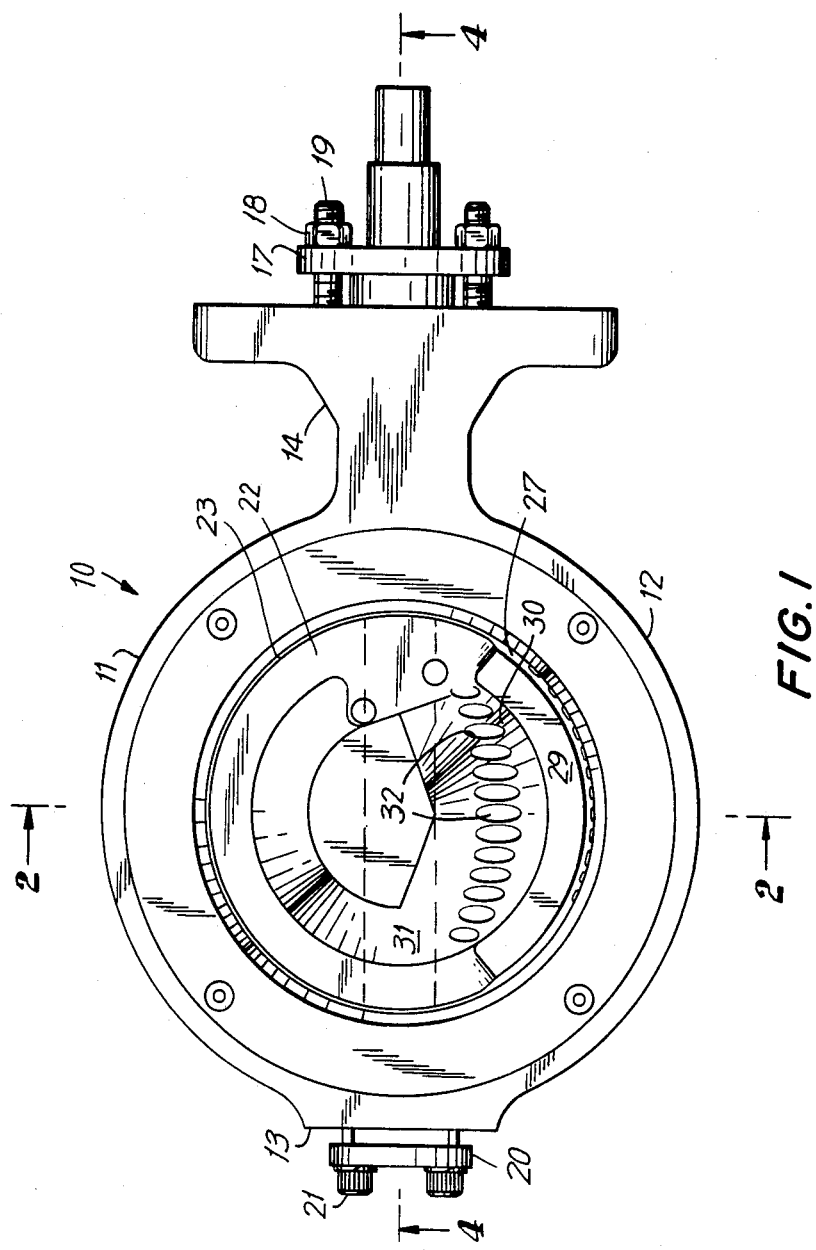
FIG. 1 is a front plan view of a high performance butterfly control valve built in accordance with the invention.
FIG. 2 is a side cross-sectional view of the valve of FIG. 1 taken generally along line 2—2 and illustrating the vane in the closed position.
Figure 4:
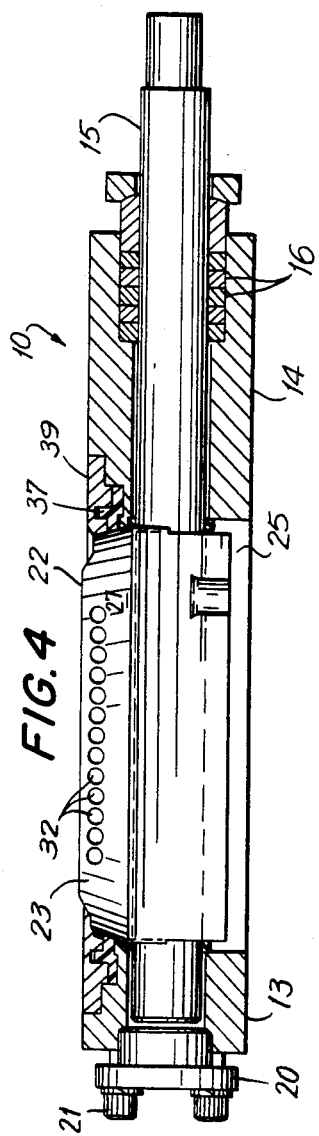
FIG. 4 is a bottom view, partially in cross-section, of the valve of FIG. 1, taken generally along line 4—4.

Referring to the drawings, and initially to FIG. 1, a butterfly valve is generally designed by the reference numeral 10. The valve includes a valve housing 11 which comprises a cylindrical valve body 12 and shaft support structures 13, 14 integral therewith to rotatably support a shaft 15. As illustrated in FIG. 4, the shaft 15 is supported at either end by the structures 13, 14 and is arranged to extend completely through the internal flow area 25 of the valve body 12. Moreover, the right end of the shaft 15 extends beyond the structure 14 for connection to an actuator whereby theshaft may be selectively controlled to rotate through a work stroke in either the clockwise or counterclockwise rotational directions, as is well known in the art (not specifically ilustrated).

To advantage, a series of sealing rings 16 is mounted between the internal surfaces of the structure 14 and shaft 15 to prevent fluid leakage. The sealing rings 16 are secured and compressed within the structure 14 by an end cap 17 which is bolted to the structure 14 by a nut 18 and bolt 19 arrangement. An additional end cap member 20 is bolted to the end of the shaft support structure 13 by suitable bolts 21 to close and seal off the valve housing 11.

A novel circular vane structure 22 including a part spherical outer periphery 23 is fixedly secured upon the shaft 15 for rotation within the valve body 12. As illustrated in FIG. 2, the shaft 15 supports the vane 22 whereby the entire outer periphery 23 of the vane 22 is in a sealed relation with a portion of the inner cylindrical surface 24 of the valve body 12. In this position, the vane 22 completely obstructs the flow area 25 of the valve body 12 to close the valve 10. Pursuant to conventional butterfly valve operation, the actuator (not specifically illustrated) operates to rotate the shaft 15 whereby the periphery 23 of the vane 22 is displaced from the iner surface 24. The shaft 15 may rotate the vane up to a quarter turn or 90° of rotation.

Figure 6:
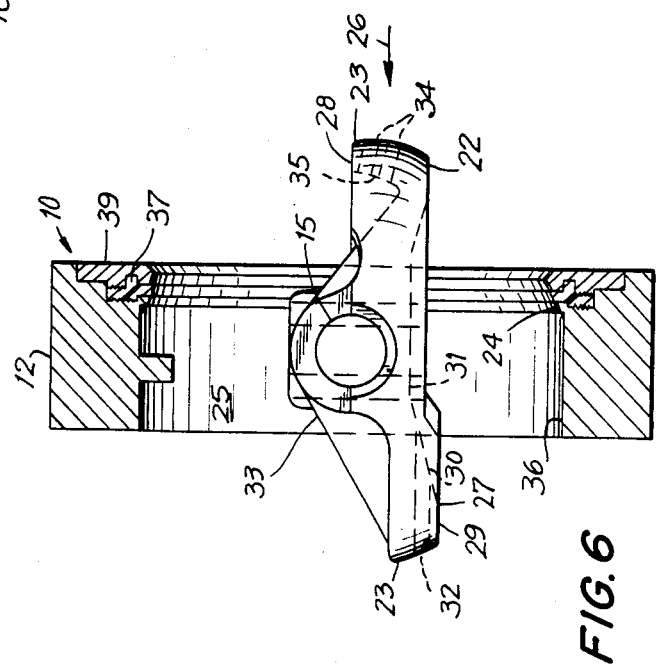
FIG. 6 is a further side cross-sectional view of the valve as shown in FIG. 2 and illustrating the vane after rotation through 90° (full open valve position).

At 90° of rotation, the diameter of the vane 22 perpendicular to the shaft 15 will extend generally parallel with the direction 26 of fluid flow (see FIG. 6). In this position, the valve 10 is in the full open position. However, it should be understood that although the valve 10 is now in the full open position, the vane 22 is still within the flow area 25 of the valve body 12 and, therefore, presents an obstruction to fluid flow. Such a vane obstruction is an inherent problem with respect to butterfly valve design and it is a principal teaching of co-pending application Ser. No. 922,782, filed Oct. 23, 1986 which is a continuation of application Ser. No. 747,980, filed June 24, 1985, now abandoned to provide a vane configuration which minimizes the flow obstruction effects of the vane while accomplishing low angle rotation flow control, as will appear. Co-pending application Ser. No. 747,980 is hereby expressly incorporated by reference.

Figure 3:
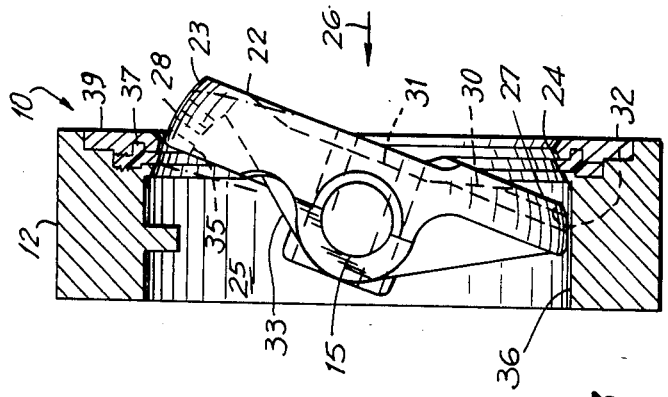
FIG. 3 is an additional side cross-sectional view of the valve as shown in FIG. 2 and illustrating the vane after rotation through a first predetermined number of degrees.

Pursuant to the invention of the co-pending application, the vane 22 is mounted upon the shaft 15 whereby the shaft 15 is offset in the downstream direction from the peripheral portions 23 of the vane 22 (as seen in FIG. 2). Moreover, the vane 22 is formed to include asymmetrical upstream and downstream extending semi-circular projections 27, 28 each extending over diametrically opposed, approximately 180° portions of the vane 22. The upstream extending projection 27 is generally streamline in configuration including a flat, smooth upstream, most top surface 29 (as seen in FIG. 2) that gradually tapers down 30 to the upstream face 31 of the vane 22. As indicated by FIGS. 3 and 6, the upstream extending projection 27 is rotated in the downstream direction through 90° to the full open vane position, whereby the face 31, tapered surface 30 and flat smooth surface 29 of the projection 27 provide a smooth, streamline and turbulence free obstruction to fluid flow.

In accordance with the low angle rotation flow control features of the vane 22, as will be described in greater detail below, the upstream extending projection 40 is provided with a series of fluid flow passages 32. Each of the flow passages 32 is arranged to extend generally parallel to the direction of fluid flow (as illustrated in FIG. 6) and includes an opening on the tapered surface 30 of the upstream extending projection 27 and a peripheral opening on the part spherical vane periphery 23. Of course, at full open position, (FIG. 6) the then parallel to flow passages 32 act to reduce the obstructing volume of the vane 22 and further minimize the obstruction effect of the vane 22 by accomodating fluid flow from the upstream oriented tapered surface opening of each passage 32 to the downstream oriented peripheral opening of each passage 32.

On the downstream face 33 of the vane 22 (see FIG. 2), the downstream extending projection 28 is formed to a length of extension that is relatively greater than the length of extension of the upstream extending projection 27 whereby two circumferentially spaced rows of flow passages 34 are formed for low angle flow control. Each of the flow passages 34 includes an opening on the part spherical periphery 23 of the vane 22 and an opening on the opposite surface 35 of the projection 28. Referring once again to FIG. 6, when the vane is in the full open position, the projection 28 will have been rotated in the upstream direction whereby the fluid flow around the face 33 of the vane 22 will first encounter the peripheral end of the projection 28. The two rows of flow passages 34 will act to reduce the obstructing volume of the projection 28 by accommodating fluid flow therethrough. In addition, according to a specific feature of the invention of co-pending application Ser. No. 747,980, the flow passages 34 are arranged to extend at a slight, upward angle relative to the direction of fluid flow 26 whereby the flow through the passages at full open position is guided upwardly to minimize turbulence around the offset shaft 15. The face 33 of the vane 22 is also tapered from either side of the shaft 15 to provide a more streamline, turbulence free flow around the shaft 15. Moreover, the projection 28 is offset below the shaft 15 when the vane 22 is in the full open position (see FIG. 6) as an additional means to minimize turbulence and facilitate smooth fluid flow across the face 33 of the vane 22 when in the full open position.

Thus, the full open obstruction and turbulence effects of the vane 22 are reduced to the lowest practicable limit while providing peripheral flow passages 32, 34 for significant low angle rotation fluid control. Referring now to FIG. 3, as the shaft 15 is operated to rotate the vane 22 in the clockwise opening direction, the periphery 23 is moved relative to the portion 24 of the valve body 12. Prior to displacement of the periphery 23 from a sealed relation with the portion 24, the flow passages 32, 34 of the projections 27, 28 will be gradually exposed to fluid flow. The vane 22 is rotated approximately 5°-6° before any of the flow passages 32, 34 are exposed to fluid flow. At approximately 5°-6° of rotation, all of the passages 32 and the first row of passages 34 will begin to be exposed to fluid flow approximately simultaneously. The entire fluid flow will be through the passages 32 and first flow of passages 34 from approximately 5°-6° of rotation, until approximately 11° of rotation. Moreover, the volume of fluid flow will gradually and controllably increase as the passages 32 and first row of passages 34 are gradually exposed to full fluid flow due to rotation of the vane 22. At approximately 11° of rotation, the periphery 23 about the projection 27 will just clear the portion 24 of the valve body 12 and the second row of passages 34 will begin to be exposed to fluid flow.

Thereafter, further rotation of the vane 22 will result in a further gradual and controlled increase in fluid flow due to the existing flow through the fully exposed passages 32 and first row of passages 34, the gradual exposure of the second row of passages 34 and the increasing flow around the displaced, downstream rotated periphery 23 about the projection 27. As discussed above, the periphery 23 adjacent the projection 27 is in close proximity (approximately 0.061") to the inner wall 36 of the valve housing 12. Moreover, the fluid flow through the passages 32 will exit the passages 32 at the peripheral openings thereof and flow toward the close inner wall 36. The close proximity between the wall 36 and periphery 23, together with the peripheral fluid egress from the passages 32 results in an inherent flow control whereby the inherent control about the projection 27 and the gradual fluid flow increase due to the gradual exposure of the second row of flow passages 34 to fluid flow provides further low angle flow control from approximately 11° of rotation to approximately 17° of rotation of the vane 22.

At approximately 17° of rotation, the periphery 23 about the projection 28 will clear the surface 24 and further fluid flow increase up to 90° of rotation of the vane 22 will be due to increased flow around both the upsteam rotated and downstream rotated portions of the periphery 23 of the vane 22. However, at approximately 17° of rotation and beyond, there is sufficient linearity between degrees of rotation and flow increase to accommodate critical flow requirements.

Referring once again to FIG. 2, when the vane 22 is in the closed position, it is critical that a leak tight seal be maintained between the periphery 23 and wall portion 24. To assure the integrity of the seal, an annular seal element 37 built in accordance with the invention is mounted circumferentially about the portion 24 of the valve wall 36 at the position where the vane periphery 23 is closest to the portion 24 to form the actual seal. The seal element 37 is formed to a predetermined cross-section, as will be described in greater detail below, and is mounted between a recess 38 formed in the valve body 12 and an annular retaining element 39 which is secured to the valve body 12 by any well known suitable means such as threaded bolts (not shown). As clearly illustrated in the detailed drawing of FIG. 5, the retaining element 39 and recess 38 define a seal containment chamber which generally conforms to the predetermined cross-section of the seal element 37. The seal element itself may be described in terms of three integral portions I, II, III which are dimensioned relative to one another and to the chamber defined by the recess 38 and retaining element 39 to provide an effective seal against the vane periphery 23. At the same time, the predetermined cross-section of the seal element 37 will provide a leak-tight seal over a wide range of fluid pressures in a manner whereby the deleterious effects of the pressure are minimized thereby greatly increasing the work life of the seal.

Pursuant to the inventive concept embodied in the seal element 37, the fluid pressure will be retained by the seal element 37 through three clearly defined, discrete pressure range operating stages of the element 37. In the preferred embodiment, the seal element 37 comprises an EPT teflon material (without any ancillary spring members or glass filled internal membranes) with a surface 40 of the first portion I conforming to serrations 41, 42 formed in the retaining element 39 and recess 38, respectively whereby the element 37 is securly mounted within the containment chamber. The surface 40, and serrations 41, 42 also provide an effective seal against leakage to the outside of the valve body 12. The first portion I is integral with the second portion II which is arranged to extend, relative to the first and third portions, in the upstream fluid flow direction. The third portion III is integral with the lower end of the second portion II and extends downwardly into the flow area 25 for sealing contact with the periphery 23 of the vane 22. As should be understood, the lower end of the portion II is conformed to the part spherical contour of the periphery 23 to provide an effective seal between the element 37 and periphery 23 from point P1 to point P2. Moreover, the portion III extends into the flow area 25 by an amount sufficient to provide a radial squeeze on the periphery 23 to form a leak tight seal.

Figure 5:
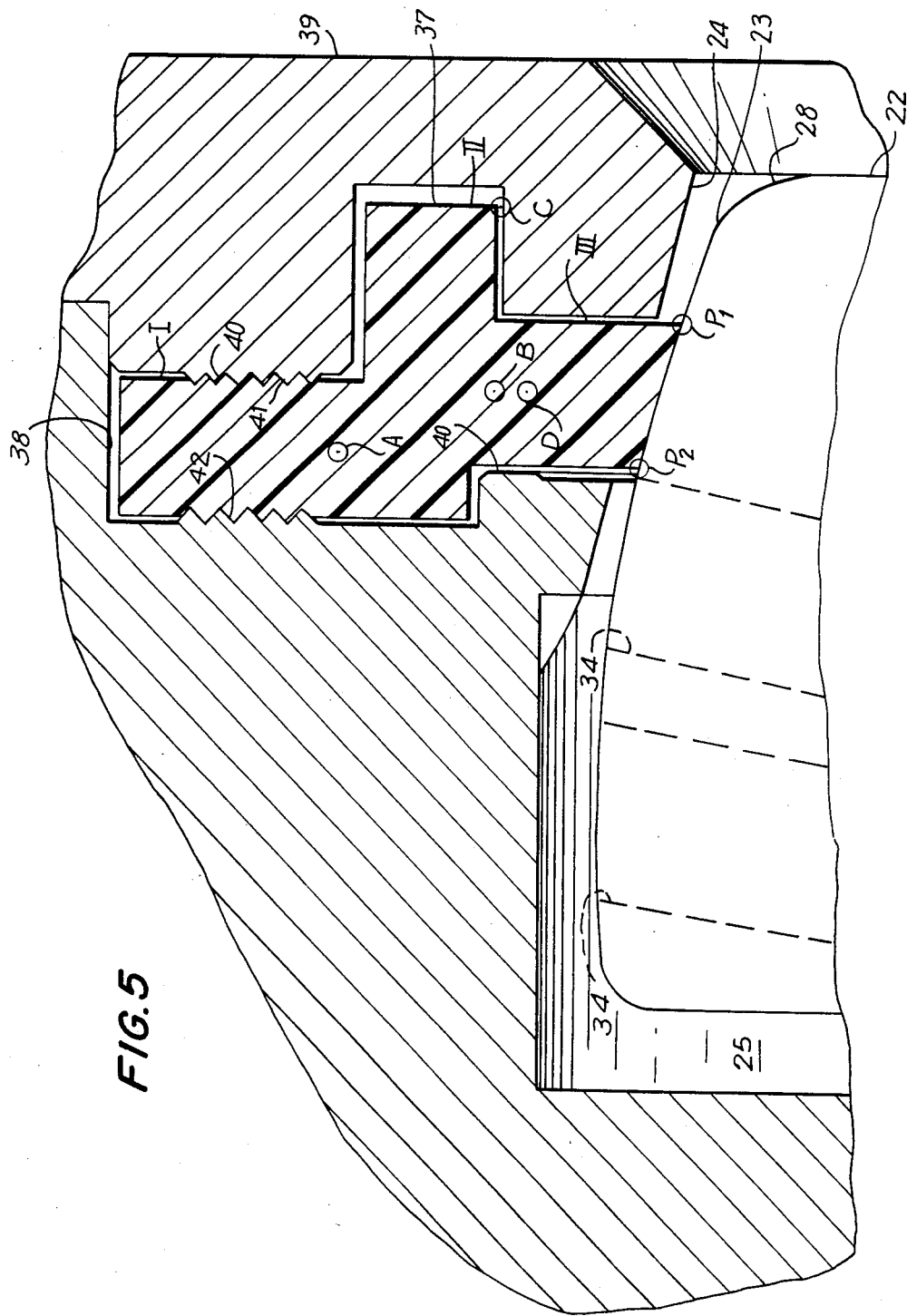
FIG. 5 is an exploded detail view of the vane seal element illustrated in FIG. 2.

As described abouve, and as illustrated in FIG. 5, the mating surface 40, and serrations 41, 42 rigidly support the seal element 37 from point A outward to the sealing surface bewteen points P1 and P2. Point A is also initially a pivot point about which the sealing surface (P1-P2) may pivot and freely, effectively contact the vane periphery 23. The stage one operating mode contemplates the seal orientation as depicted in FIG. 5 during a fluid pressure range of from 0 PSIG to approximately 100 PSIG. The only contact points for the seal element 37 are at the mating surfaces 40, 41, 42 and with the vane periphery 23 between points P1 and P2. The seal element 37 is dimensioned such that the radial squeeze on the periphery 23 is sufficient to seal fluid under the low pressure conditions.

Stress and deflection on the seal 37 in the low pressure stage one operating mode may be approximated by applying the vertical deflection and unit stress at surface of plate formulas set forth on pages 173–174 of the Handbook of Formulas for Stress and Strain by William Griffel. (New York: Frederick Ungar Publishing Co., 1966, hereby expressly incorporated by reference). The constants used for the calcuations according to formulas as applied to the stage one mode of the seal element 37 are determined from loading case 6 of Table 1 (page 175) (circular plate with concentric hole—outer edge fixed and supported, uniform load over entire actual surface).

A prototype seal element according to the invention was constructed for use in connection with the 6 inch prototype valve discussed above. The prototype seal element was made from an EPT teflon material having a tensile strength of 4000 psi, a tensile modulus of elasticity equal to $10 \times 40^4$ and a tensile elongation equal to 400%. Moreover, the prototype seal element had a thickness of 0.156 inches, an inner diameter (to P1-P2) equal to 5.643 inches and an outer diameter (to fixed point A) equal to 6.388 inches. By applying the Griffel formulas according to Table 1 case 6 it was determined that with the above seal values and dimensions operated under a pressure of 100 psi, the maximum vertical deflection of the prototype seal is 0.0095" and the maximum stress at the outer edge of the seal is 1889 psi.

When the operating environment of the valve is changed to be within a pressure arrangement of between 100 psig and 500 psig, the fluid pressure will push the seal element 37 into contact with the support surface 40 at point B. Accordingly, the seal element 37 will no longer be unsupported from point A to points P1-P2, but will have some support from the support surface 40 applied at point B. The support introduced at point B will tend to inhibit increasing stresses at point A due to the higher fluid pressure environment. When the seal element 37 is in contact with the support surfaces 40 (i.e., a pressure range of from 100 psig to 500 psig), it will be in the stage two operating mode contemplated by the inventive concept.

A reasonable approximation of the true working stresses on the seal element 37 during second mode operation may be found by taking an average of the calculated stresses from each of case 6 and case 13 (both edges fixed, balanced loading (piston)) of Table 1. Such an approximation considers point B to be part way between rigidly fixed and freely supported. The case 6 and case 13 calculations for the prototype seal (all valves and dimensions for the seal being the same as in the stage one with exception of the outer diameter which is now considered to be 6 inches (to point B) and formula constants according to case 6 and case 13 of Table 1)) operated at 500 psig indicate a case 6 maximum deflection of 0.0116 inches and a maximum stress at the outer edge of 942 psi and a case 13 maximum deflection of 0.0065 inches and maximum stress (at outer edge) of 1345 psi.

Thus, the higher pressure enviroment of the stage two operating mode causes the seal element 37 to naturally assume a different geometric orientation relative to the seal containment chamber defined by the recess 38 and retaining element 39 by pivoting into contact with the support surface 40. The reorientation of the seal element 37 and the additional part rigidly fixed, freely supported seal retention introduced at point B advantageously changes the stress effects upon the seal element 37 by reducing the outer diameter dimension, from point A to point B, and by changing the Griffel case approximations from case 6 to an average of case 6 and case 13. Accordingly, the maximum stress upon the outer edge of the seal member is retained at a level below the stresses that would be introduced upon the seal element 37 had the reorientation not occured.

The third operating mode of the seal element 37 occurs when the operating enviroment includes fluid pressures above 500 psig. At such higher pressure operation, the fluid pressure causes the seal element 37 to deflect further until the upstream extending porton II of the seal element 37 contacts the retaining element 39 at point C. In this orientation, the seal element 37 may be considered as being rigidly held at points P1 and P2 and at point D (see FIG. 5). Accordingly, the seal element 37 will now have an effective outer edge diameter (to point D) that is considerably smaller than the outer edge diameter of the stage one operating mode (to point A) resulting in a reduced stress effect upon the seal caused by the higher pressure enviornment. Moreover, the rigid support at point D as well as the continued retention applied to the seal at point B provides a stress distribution upon the seal as a pure case 13 situation (Table 1 of Griffel Handbook). In the prototype seal discussed above, the seal element 37 in the third operating mode will have an outer diameter, (to point D) of 5.925 inches (as opposed to 6.388 inches for stage one (to point A) and 6.0 inches for stage two (to point B)) resulting in a case 13 maximum deflection of 0.006 inch and maximum stress of 1268 psi at 750 psig pressure operation.

Thus, in accordance with the invention embodied in the seal element 37, the three discrete pressure range modes of operation inherently and automatically orient the seal relative to the seal confinement chamber to move the seal retention point (outer diameter) inward toward the sealing surface defined by points P1 and P2. This results in the formation of a leak tight seal around the outer perimeter of the vane while confining the fluid pressure and stress effects upon the seal to within practical minimum ranges. The relatively low stress throughout the various pressure ranges of seal operation minimize seal wear and cold flow to achieve a long, effective seal work life. Significantly, the seal element 37 is operable without the need of glass filled internal membranes for dimensional stability or additional spring elements to impart a radial squeeze on the vane.

The above-described preferred embodiment of the invention is meant to be representative only, as certain changes may be made therein by persons skilled in the art without departing from the clear teachings of the invention. Accordingly, reference should be made to the following appended claims in determining the full scope of the invention.

I claim:

1. A high performance seal arrangement for a butterfly control valve, which comprises:
   (a) a valve housing,
   (b) a generally disc-shaped vane mounted for selective, controlled rotation in said valve housing,
   (c) said vane including a periphery and being rotatable through a quarter turn of rotation with the periphery of said vane being in close proximity to said valve housing at 0° of rotation,
   (d) a unitary seal element extending circumferentially within said valve housing at the portion thereof in close proximity to said vane periphery when the vane is at 0° of rotation,
   (e) said seal element having a lowermost portion arranged to engage said periphery to form a leak tight seal,
   (f) said lowermost portion being integral with a midportion of the seal element, said mid-portion being arranged to extend in the upstream direction,
   (g) said mid-portion being integral with a topmost portion of the seal element, and
   (h) a seal containment chamber formed in said valve housing to receive said seal element,
   (i) said containment chamber physically engaging said topmost portion of the seal element to support said seal element and having a cross section that generally conforms to and surrounds the cross section of said element,
   (j) said lowermost portion extending from said containment chamber to said leak tight seal with the periphery of the vane,
   (k) said seal element being flexible and generally pivotable about the topmost portion thereof,
   (l) said seal element being oriented relative to said containment chamber during three predtermined unidirectional pressure ranges, whereby:
      (1) during said first predetermined pressure range said topmost portion only and said containment chamber at the support engagement of element (i) are in contact,
      (2) during said second predetermined pressure range the contact of (1) above continues and a preselected point on the seal element at a portion radially inward from said support engagement of element (i) and on the downstream side of said seal element contacts a surface of the containment chamber that extends perpendicular to the direction of fluid flow through the valve housing to provide a part rigidly fixed, part freely supported contact with said seal containment chamber, at a point located radially inward from the support engagement of element (i) and
      (3) during said third predetermined pressure range the contacts of (1) and (2) above continue and a preselected point on said midportion contacts a surface of the containment chamber that extends parallel to fluid flow through the valve housing to form a further rigid support for the seal element that is spaced radially inward from both the support engagement of element (i) and the support contact of element (1) (2).

2. The high performance seal arrangement according to claim 1, further characterized by said seal element comprising an EPT teflon material.

3. The high performance seal arrangement according to claim 1, further characterized by said seal containment chamber being formed to include serrations arranged to mate with said topmost portion of said sealing element to thereby engage and support said seal element.

4. A high performance seal for a valve, which comprises:
   (a) a valve housing, (b) means selectively movable within said valve housing to selectively obstruct fluid flow through the valve housing to provide valve shutoff, (c) a unitary seal element being interposed between said selectively movable means and said valve housing when said selectively movable means is at valve shutoff to form a leak tight seal between said selectively movable means and said valve housing, and (d) a seal containment arranged in said valve housing to engage and support preselected portions of said seal element to thereby provide a seal element retention point, (e) said seal containment chamber having a cross-section that generally conforms to and surrounds the cross-section of said seal element, (f) said seal element and said containment chamber having predetermined, opposing, cooperating surfaces, (g) said seal element being exposed to and pivotable by a unidirctional pressure of fluid in said valve housing to be variably oriented relative to said seal containment chamber as a function of varying pressures of the fluid, (h) said opposng, cooperating surfaces of the seal element and the seal containment chamber being in varying predetermined contacting relationships varying with incrementally increasing unidirectional pressures to provide increasing support for said seal element and to incrementally displace said seal element retention point inwardly toward the sealing surface of said seal element for successive higher predetermined unidirectional pressures to thereby provide a practicable minimal stress distribution and seal deflection on said seal element.

5. The high performance seal for a valve according to claim 4, further characterized by, (a) said seal element being exposed to and pivotable by a unidirectional pressure of fluid as a funtion of at least two predetermined pressure ranges of the unidirectional fluid, and (b) said opposing, cooperating surfaces of the seal element and seal containment chamber being in predetermined varying contacting relationships during each of said at least two predetermined pressure ranges.

* * * * *